Jan. 8, 1929.

B. E. KATZ 1,698,232

HARNESS AND COLLAR PAD

Filed Sept. 2, 1927

BURL E. KATZ
INVENTOR

BY Victor J. Evans
ATTORNEY

WITNESS:

Patented Jan. 8, 1929.

1,698,232

UNITED STATES PATENT OFFICE.

BURL E. KATZ, OF NORFOLK, NEBRASKA.

HARNESS AND COLLAR PAD.

Application filed September 2, 1927. Serial No. 217,181.

The present invention relates to protectors to be used in connection with horse collars, harness and the like, and has for its object to provide a protector which will prevent the neck or other parts of the animal's body from becoming galled, bruised or otherwise damaged.

Another object of the invention is to provide against the horse or other animal becoming injured by contact of the harness or collar with his body.

Other objects and advantages of the invention will appear in the following specifications and to be pointed out in the appended claims, and I wish to be understood that I do not wish to be limited in the scope of my invention in any particular or to any particular use thereof or any particular material used except as limited by the scope of the claims hereto appended.

In the drawings forming part of this specification,

Figure 1:
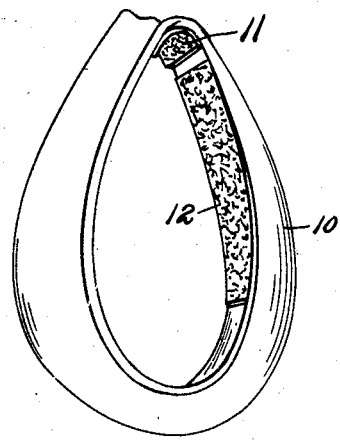
Figure 1 is a perspective view showing my device applied to a horse collar.

I am aware that certain material has been used in connection with collars and the like, but I am convinced that the material of which my pad is constructed is superior in its operation and softer to the touch of the horse and to the skin of the animal. In the construction of my device, I wish it to be understood that the particular form of the pad is not to be limited to those shown in the drawings, and the shape thereof may be made to conform to any part of a harness or collar to which it may be found desirable to apply the same.

Figure 2:
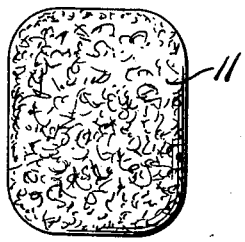
Figure 2 is one portion of the pad device.
Figure 3:
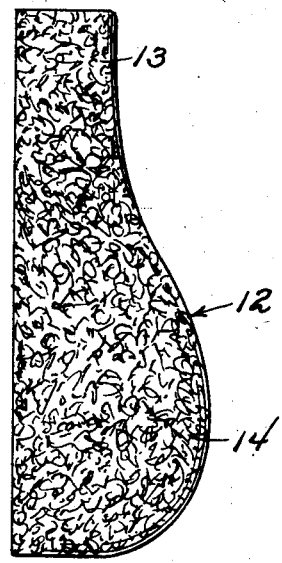
Figures 3 and 4 show other portions suitable for use with a horse collar, or the neck pad used in connection therewith.
Figure 4:
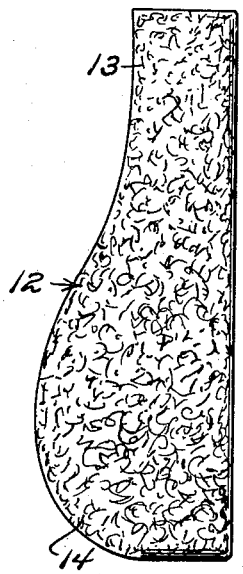
Figure 5:
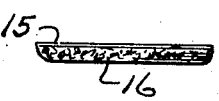

My pad I form of sponge rubber, one surface or rind thereof being removed as shown in Figure 5, the other rind remaining in place as shown at 15 of said figure. The device as applied to a collar as shown at 10, consists of the pad 11 adapted to be secured within the upper portion of the collar which rests on the top of the horse's neck. The pad as shown at 11 is represented in Figure 2, the other pad represented in Figures 3 and 4 and designated by the numeral 12 being provided with an upper narrow neck portion 13 and a lower enlarged portion as at 14. The latter is adpted to spread out behind the collar and protect the shoulders of the horse. These sections 11 and 12 may be secured within the collar in any suitable manner and are preferably pasted thereto by a suitable form of glue which may be applied to the unstripped surface 15 before the pads are put in place, presenting the spongy surface of the pad to the animal's back.

In the preparation of the material to be used as pads, it is first stripped of one rind and put on an emery wheel to smooth the surface thereof. Pads prepared and used in the manner as set forth do away with soreness, galled shoulders, fibrous growths, bruises, sore shoulders and the like. It also keeps the shoulders free from dirt, grit and sweat thereby cooling and permitting the healing of shoulders that are already sore.

What I claim is:—

1. A pad for use in connection with a harness, collars and the like comprising a piece of sponge rubber having the rind stripped therefrom on one side and retained on the other and an adhesive applied to the smooth rind space.

2. In a device of the character described, a pair of pads placed side by side in a horse collar, said pads having a narrow upper neck and enlarged curved portion toward the bottom thereof, each pad being of sponge rubber with a smooth rind face glued to the inside of the collar.

In testimony whereof I affix my signature.

BURL E. KATZ.